No. 617,217. Patented Jan. 3, 1899.
R. H. AVERY, Dec'd.
F. R. AVERY, Administrator.
CULTIVATOR SHOVEL CLAMP.
(Application filed Feb. 16, 1897.)
(No Model.)
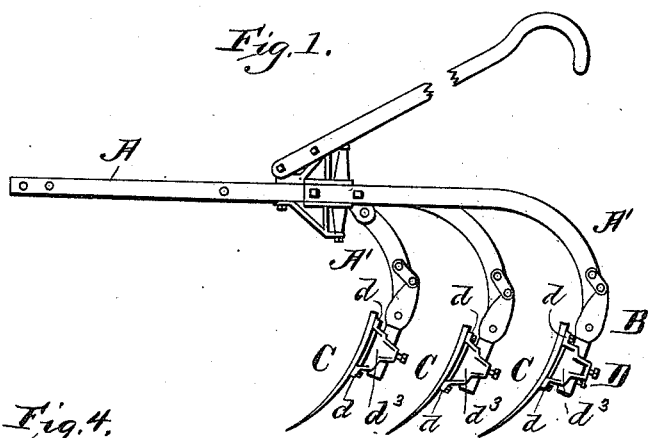
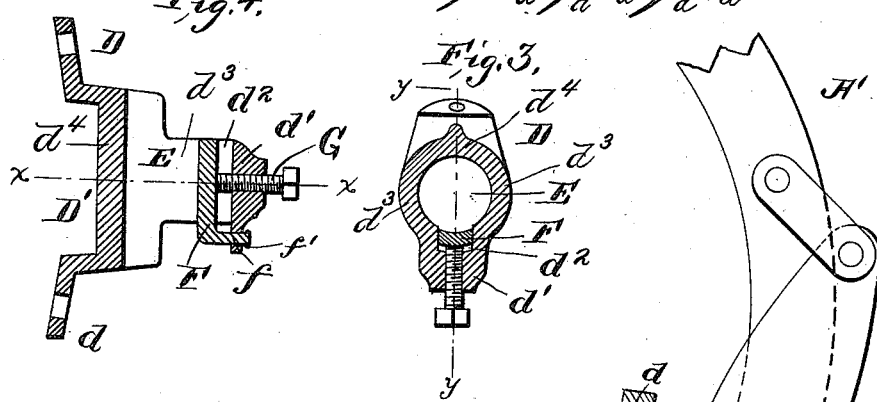
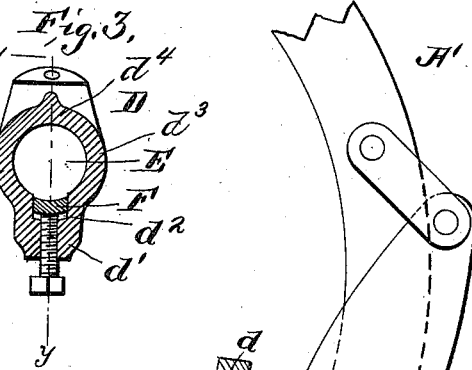
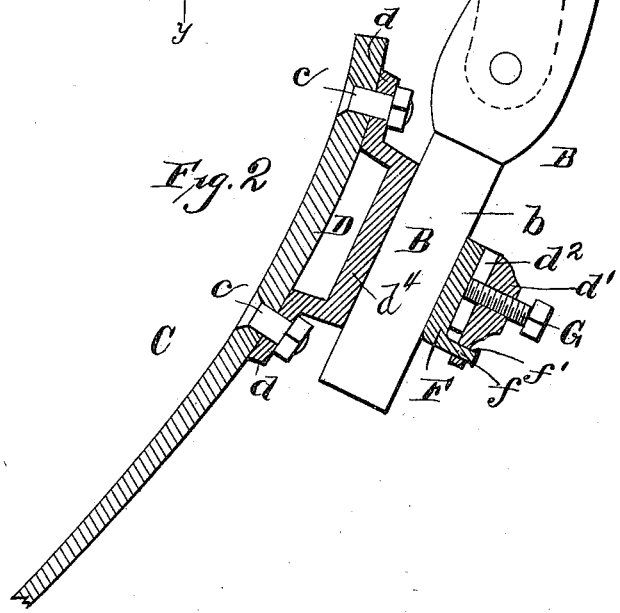
Witnesses
Wm H. Edwards
Arthur L. Bryant
Inventor
F. R. Avery, Administrator of estate of Robert H. Avery
N. H. Bliss
atty
THE NORRIS PETERS CO., PHOTO-LITHO., WASHINGTON, D. C.

UNITED STATES PATENT OFFICE.

FREDERIC R. AVERY, OF PEORIA, ILLINOIS, ADMINISTRATOR OF ROBERT H. AVERY, DECEASED, ASSIGNOR TO THE AVERY PLANTER COMPANY, OF SAME PLACE.

CULTIVATOR-SHOVEL CLAMP.

SPECIFICATION forming part of Letters Patent No. 617,217, dated January 3, 1899.

Original application filed March 17, 1890, Serial No. 344,138. Divided and this application filed February 16, 1897. Serial No. 623,934. (No model.)

*To all whom it may concern:*

Be it known that ROBERT H. AVERY, deceased, of whose estate I, FREDERIC R. AVERY, am administrator, I being a citizen of the United States, residing at Peoria, in the county of Peoria and State of Illinois, invented certain new and useful Improvements in Cultivator-Shovel Clamps; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a side elevation of a sufficient part of the cultivator to illustrate the manner of applying the invention. Fig. 2 shows part of a standard and a vertical section of a shovel on a larger scale. Fig. 3 is a section on the line $x\ x$ of Fig. 4. Fig. 4 is a section on the line $y\ y$ of Fig. 3.

In the drawings there is illustrated at A the beam or drag-bar, such as is commonly used in cultivators, this having at the rear end one or more downwardly-curved shanks A', to which the shovels are attached. At the lower end of each of the shanks A' there is shown a pivoted shovel-support (indicated as a whole by B.) It has a downwardly-extending stem $b$, which is preferably circular in section.

C indicates the shovel-blade.

It will be understood that the parts above referred to may be of any well-known or preferred construction, as the invention can be applied to each of any of the series of beams and attachments in use.

The holder for the shovel is indicated as a whole by D. It has a central offset body part D' and vertically-extended ears $d\ d$, which are secured by bolts $c$ to the shovel-blade. The body part D' is provided with a central aperture E and with a lateral extension or thickened part $d'$.

$d^2$ is a groove in the extension $d$ and communicating with the central aperture E.

The stem $b$ of the shovel-support is situated in the aperture E, and the shovel-holder D can be adjusted vertically or laterally upon this stem, as may be desired.

For firmly fastening the stem-piece $b$ and the holder D there is employed a set-screw G, which passes through the extension $d$, the latter having a threaded aperture to receive it; but in order to avoid the contacting of the end of the screw directly upon the stem $b$ there is interposed a clamping-block. This may be of any of several forms, as desired; but at present one substantially such as is indicated at F is preferred. It is mounted in the groove $d'$, and the set-screw G impinges upon the rear or outer face of it. The inner face is preferably concave, so as to fit snugly against the surface of the stem $b$. Devices of this sort overcome entirely the disadvantages incident to those structures in which the set-screw bears directly against the stem, for in such case not only is the surface of contact very reduced, but the pressure of the screw results in forming indentations or recesses in the surface of the stem, which seriously interfere with fastening the shovel in the exact places in which it is desired to hold it. By the employment of a block with an expanded surface the contact-surface is largely increased and the indenting of the stem is entirely obviated.

The present clamping-block is particularly advantageous in that it is permanently held in place. This is accomplished in the construction shown by having a tongue $f$ formed on or secured to the block and seated in an aperture at $f'$ in the metal at $d'$. These last-described parts allow the block to be pushed in or out at any time; but they always insure that it shall remain attached to the machine and shall not be lost in the field. To still further guard against such loss, the end of the pin $f$ is riveted somewhat to prevent it from escaping from the aperture. It will be seen that the screw G is arranged on lines such that it extends directly toward the standard B, and hence in case of breakage or loss of the clamp-block F the screw itself can be utilized, at least temporarily, as a holder and the shovel need not be thrown entirely out of action.

The principal part of the device is the socket-piece itself, the clamp-blocks being comparatively small, and in case of loss or breakage one can readily be provided, even by a farmer, the device in this respect being superior to any heretofore used having relatively large castings as clamps hinged to the main part.

It will be seen that the socket has the two side parts $d^3$ rigidly attached to the base part $d^4$, having the ears $d$ in contradistinction from having a hinge connection with the base, and it will be further seen that clamping pressure is exerted against more or less of these side parts without having any set-screw or equivalent bearing directly against the stem $b$—that is to say, a powerful clamping pressure is provided for by having a movable surface along the outer portion of the surface of the stem, which movable surface can be advanced against the stem by a screw, but there being, as aforesaid, no hinge connection between the side parts $d^3$ and the base; and so long as these features of the invention are retained there can be modifications made in many ways, it being merely necessary to have a surface surrounding the stem of which more or less is stationary and more or less movable under the action of the screw-pressure.

The subject-matter of this case is withdrawn from an application filed March 17, 1890, Serial No. 344,138, by said R. H. Avery, and no claim is herein made to any of the matters claimed in said original case, of which this is a division.

What is claimed is—

1. In a cultivator, the combination with the shovel and the shovel-holder having a socket-piece adapted to receive a beam or standard, of the sliding clamp-block permanently mounted in the socket-piece or holder, the parts of the socket and the clamp being permanently connected together, and the screw for pressing the block against the standard or beam, substantially as set forth.

2. In a cultivator, the combination with the shovel-holder having a vertical aperture for a standard or support, of the sliding block F arranged within said aperture and held permanently therein by a pin $f$ and the screw for adjusting the sliding block in the shovel-holder, substantially as set forth.

3. In a cultivator, the shovel-holder having a socket-piece provided with a recess communicating with the passage for the shovel-standard, in combination with a clamping-block fitted in said recess and having a riveted pin extending through an aperture in the socket-piece and means for forcing the block inward, substantially as set forth.

4. In a cultivator, the combination with the shovel and the shovel-holder having a socket-piece adapted to receive a beam or standard, and having that portion which is in front of the standard rigidly connected to the shovel-base, of the set-screw adapted to be pressed directly against the standard and a movable clamp-block interposed between the screw and the standard whereby the standard can engage either with the block when present, or with the screw, substantially as set forth.

5. In a cultivator a shovel-holder having a base for fastening to the shovel and a socket constructed to provide a clamping-surface around the standard, a part of said surface being provided by projections $d^3$, $d^3$ rigid with the base and extending backward therefrom, and a part of said clamping-surface being movable toward the standard and a screw for forcing the movable part of the clamping-surface against the standard, said screw being arranged to be out of contact with the standard, substantially as set forth.

In testimony whereof I affix my signature in presence of two witnesses.

FREDERIC R. AVERY,
*Administrator of R. H. Avery, deceased.*

Witnesses:
JOHN B. BARTHOLOMEW,
GEORGE F. CARSON.